(12) United States Patent
Van de Ven et al.

(10) Patent No.: US 6,667,786 B2
(45) Date of Patent: Dec. 23, 2003

(54) DISPLAY DEVICE AND LENTICULAR SCREEN

(75) Inventors: Johannes Cornelis Van de Ven, Eindhoven (NL); Leo Marie Weegels, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 26 days.

(21) Appl. No.: 10/020,020

(22) Filed: Dec. 7, 2001

(65) Prior Publication Data

US 2002/0093607 A1 Jul. 18, 2002

(30) Foreign Application Priority Data

Dec. 12, 2000  (EP) .............................................. 00204437

(51) Int. Cl.[7] .................................................. G02F 1/13
(52) U.S. Cl. ......................................... 349/95; 349/65
(58) Field of Search ...................................... 349/65, 95

(56) References Cited

U.S. PATENT DOCUMENTS 5,462,700 A    10/1995  Beeson et al. ............. 264/1.27
5,521,725 A  *  5/1996  Beeson et al. ................. 349/48
5,751,387 A  *  5/1998  Iigahama et al. ............. 349/95
6,163,351 A  * 12/2000  Nakayama ................... 349/61

* cited by examiner

Primary Examiner—James Dudek
(74) Attorney, Agent, or Firm—Eric M. Bram

(57) ABSTRACT

The invention relates to a display device comprising LC panels arranged next to each other. To reduce the visibility of a seam between two adjacent LC panels and to avoid grey scale inversion, collimated light is applied. A lenticular foil is used to enlarge the viewing angle in the horizontal direction. If the seam is only present in a vertical direction, the widest viewing angle in the vertical direction should be chosen. This choice leads to an asymmetric viewing angle in a horizontal direction. To reduce the asymmetry in the horizontal viewing angle, the lenticulars of the screen have a trapezoidal shape. The apex angle depends on the desired spread and viewing angle symmetry in the horizontal direction.

8 Claims, 3 Drawing Sheets

DISPLAY DEVICE AND LENTICULAR SCREEN

Figure 1:
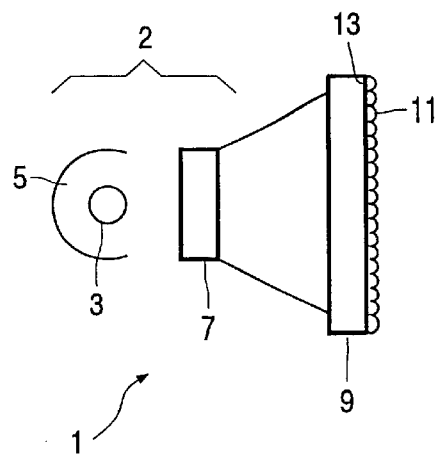

The invention relates to a display device as defined in the precharacterizing part of claim 1.

The invention further relates to a lenticular screen for use in a display device.

The display device is used for displaying television and graphic images.

The display device may comprise two or more liquid crystal display panels which are arranged next to each other for enlarging the physical size of the display, without enlarging the size of the display panels. In this way, a relatively cheap display is obtained. A seam is present at the neighboring sides of the liquid crystal display panels. In order to reduce the visibility of the seam between the liquid crystal display panels, it is necessary to prevent light entering the seam area. This is achieved by a black mask, which is periodical across the entire display, and by the application of collimated light distribution. The collimated light distribution requires a lenticular screen which is optically coupled to the liquid crystal display panels for enlarging the luminance distribution of the display after the light has passed through the liquid crystal display panels.

The display device may have such a configuration of liquid crystal display panels that only vertical seams are present. Consequently, also the black mask has only a periodical vertical structure. In this type of display device, the requirements of the collimated light source in the vertical direction are less stringent and the lumen output or the luminance at the front of the display device can be increased. In order to obtain an increased lumen output of the display device, the widest possible collimating angle is chosen for which no grey scale inversion occurs in the vertical direction of the liquid crystal display device.

A disadvantage of the present display device is that this collimating angle will give rise to a viewing asymmetry in the horizontal direction.

It is an object of the invention to provide a display device with a reduced viewing angle asymmetry in the horizontal direction. This object is achieved by a display device according to the invention as defined in claim 1. The trapezoidal structure of the lenticular screen of the display device according to the invention mixes light rays traversing the liquid crystal panels at positive and negative angles about the normal in the second direction. The light rays coming from the different positive and negative angles will be totally reflected at the slanted sides of the trapezoidal structure, and the asymmetry of the luminance in the viewing angle in the second direction is averaged and will be reduced. The known lenticular screens only enlarge the luminance distribution but do not mix the light incident at oblique angles with respect to the normal of the lenticular screen, so that the asymmetry in the second direction is not reduced.

Advantageous embodiments of the display device according to the invention are defined in the dependent claims.

These and other aspects of the invention are apparent from and will be elucidated with reference to the embodiments described hereinafter.

Figure 2:
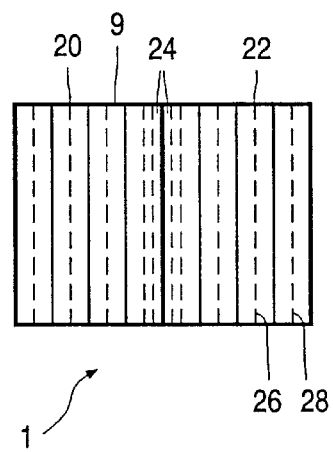
Figure 4:
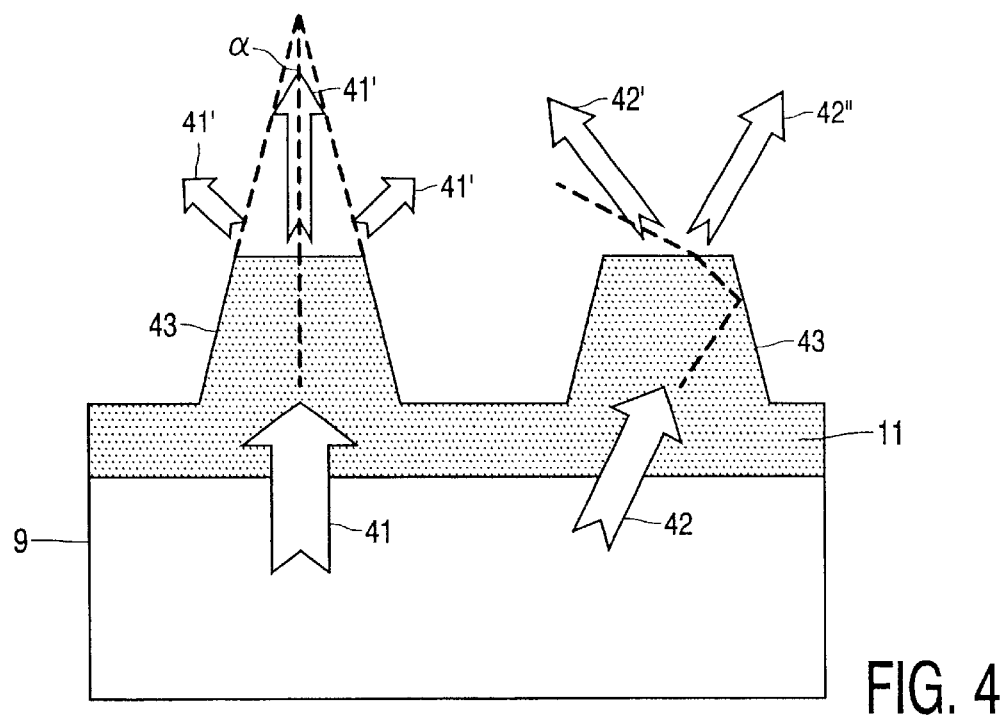
Figure 3A:
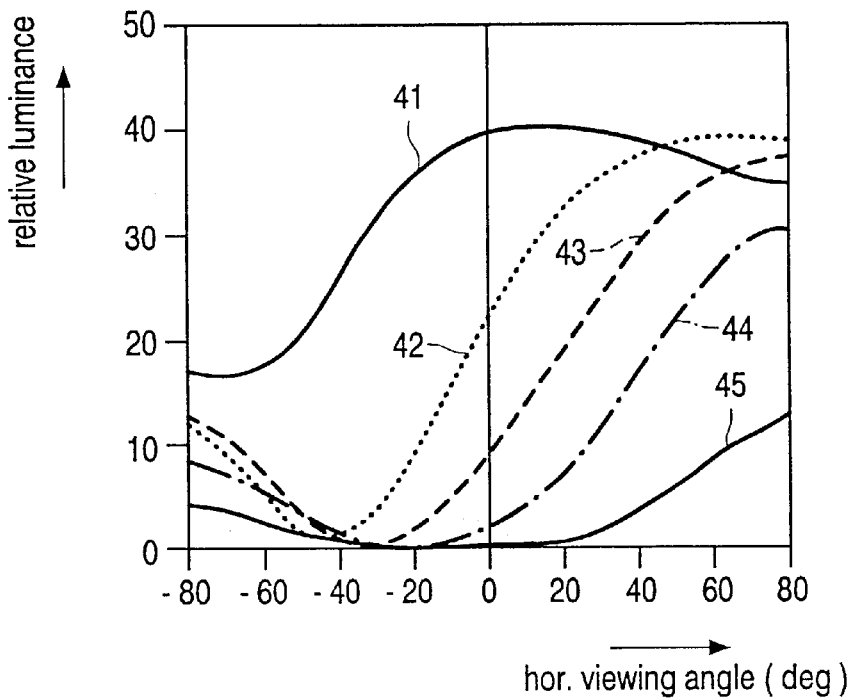
Figure 3B:
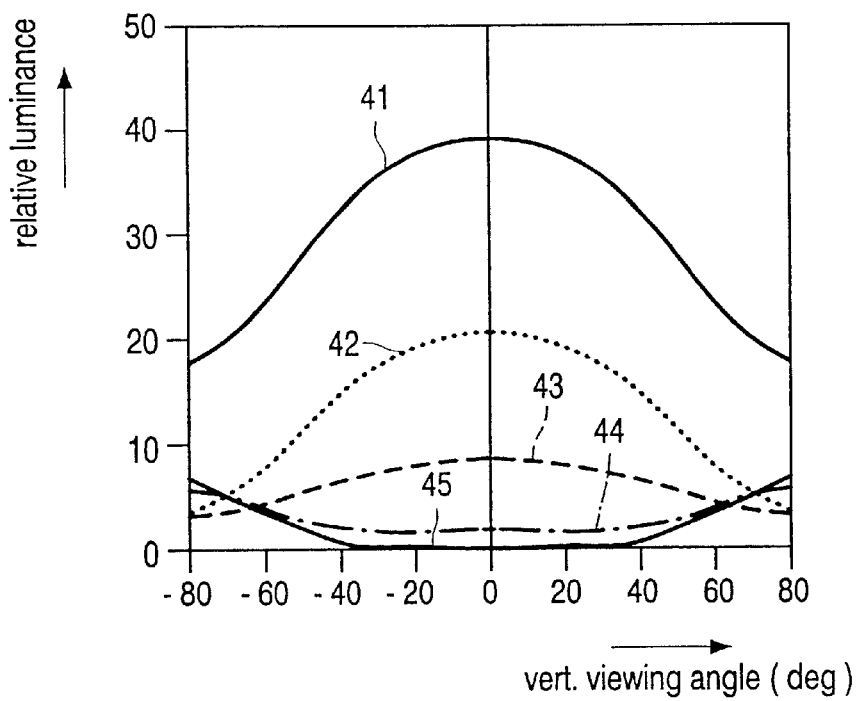
Figure 3C:
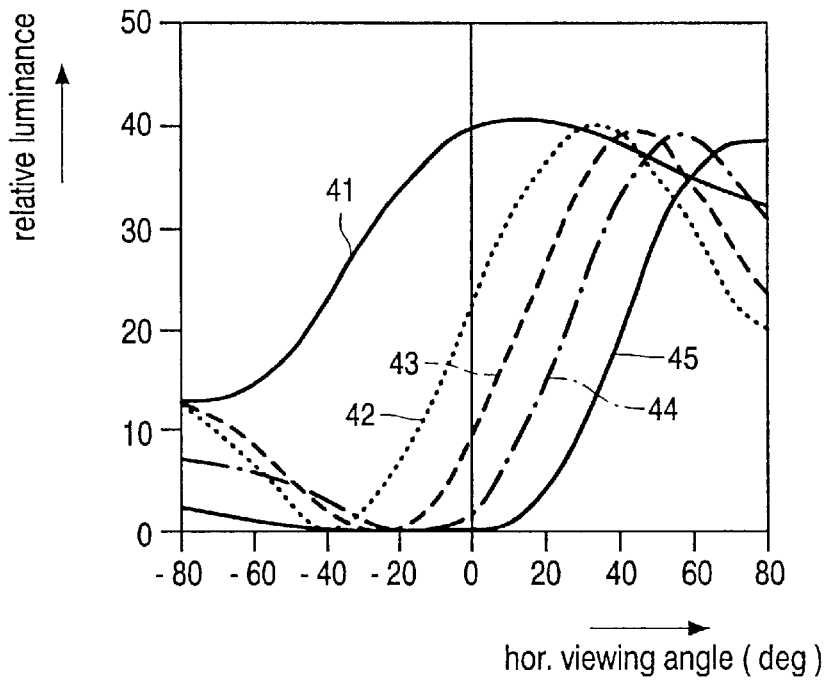
Figure 3D:
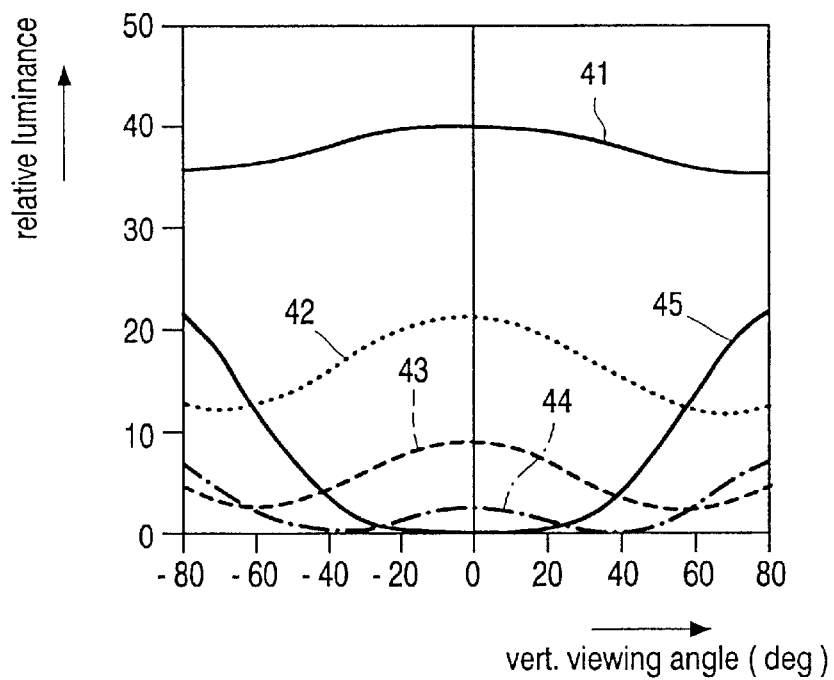

In the drawing:

FIG. 1 shows a liquid crystal display device and a collimating illumination system, FIG. 2 is a front view of a display device comprising two liquid crystal cells, FIG. 3 shows several graphs of simulated luminance versus viewing angle at different grey levels in vertical and horizontal directions for a twisted-nematic liquid crystal display panel and FIG. 4 is a cross-section of a trapezoidal structure of a lenticular screen.

FIG. 1 is a schematic view of the display device 1 and the illumination system 2. The illumination system 2 comprises a light source 3, a reflector 5 and a collimating system 7. Preferably, the collimation angle is about 30° to prevent grey scale inversion in the vertical direction. Furthermore, the display device 1 preferably comprises two liquid crystal display panels 20,22 configured next to each other and separated by a seam 24. In this example, the seam 24 between the two liquid crystal display panels 22,24 is in the vertical direction. Furthermore, the display device 1 is provided with a lenticular screen 9 enlarging the luminance distribution in the horizontal direction due to the application of the collimated illumination system 2.

The liquid crystal display panels 20 and 22 comprise conventional 90 degree twisted-nematic liquid crystal cells. The rubbing directions for an orientation layer of the liquid crystal cell are chosen to be such that the viewing angle in the first c.q. vertical direction is symmetric about a normal to the liquid crystal display panel 20,22. Consequently, the viewing angle in the horizontal direction becomes asymmetric about the normal. In order to reduce the visibility of the seam 24, it is necessary to prevent light entering the seam area. This can be achieved by providing the liquid crystal display panels 20,22 with a black mask 26 with a periodical line structure in the vertical direction.

FIG. 2 is a front view of display device 1 comprising two liquid crystal display panels 20,22. The black mask 26 covering the display panels 20,22 is represented by the periodical line structure 28. The periodical line structure 28 matches with the pitch of the picture elements in the second, c.q. horizontal direction. Furthermore, the application of the collimated illumination system 2 as is shown in FIG. 1 prevents also light entering the seam area. If the display device 1 has only a single seam 24 in the vertical direction, the requirements imposed on the collimating illumination system 7 in this direction may be less stringent. In order to increase the light output or the front luminance of the display device 1, the widest collimating angle is chosen to provide the largest viewing angle at which no grey scale inversion occurs in the vertical direction. This angle can be deduced from FIG. 3b and FIG. 3d.

FIG. 3 shows a simulated luminance versus viewing angle characteristics at 5 different grey levels in different directions of a liquid crystal display panel. FIG. 3a and FIG. 3b show the respective luminance versus viewing angle characteristics in the horizontal and the vertical direction for a liquid crystal display panel optically coupled with a Wide Viewing Angle foil laminated on the liquid crystal display panels. FIG. 3c and FIG. 3d show the respective luminance versus viewing angle characteristics in the horizontal and the vertical direction for a liquid crystal display panel without such Wide Viewing Angle foils. The nominal grey levels chosen are 0, 0.25, 0.5, 0.75 and 1, respectively. The respective curves 41–45 represent the luminance versus viewing angle characteristics. For these Figures, it is assumed that the light distribution is isotropic. In FIGS. 3a to 3d, the angles for which the curves 41 to 45 cross each other indicate the start of grey inversion.

As described hereinbefore, the lenticular screen 9 enlarges the limited light distribution. However, the wide collimating angle in the display device 1 gives rise to an asymmetric viewing angle in the horizontal direction, see FIG. 3c and FIG. 3d. In order to reduce the asymmetry in the vie wing direction in the horizontal direction, the lenticular screen 9 has a trapezoidal structure 11.

FIG. 4 shows a portion of a lenticular screen 9 having a trapezoidal structure 11. In this trapezoidal structure 11, light rays 42 bouncing at the slanted sides 43 of the trapezoids are reflected by means of total reflection, and rays traversing the liquid crystal panels 20,22 at different positive and negative horizontal angles are mixed. In this way, the asymmetry of the viewing angle in the horizontal direction can be averaged and is therefore reduced. The desired horizontal spread and the required viewing angle symmetry in the horizontal direction determine the apex angle α of the trapezoids 43. In practice, this apex angle is 20°. A larger angle α, possibly in combination with a deeper trapezoidal structure, provides more correction and a larger horizontal spread. A smaller angle α provides less correction and a smaller horizontal spread.

Furthermore, the lenticular screen 9 is provided with a bulk diffuser dispersed in the host material of the trapezoidal structure 11 for widening the luminance distribution in the vertical direction. Preferably, the refractive index of the bulk diffuser deviates from the refractive index of the host material by about 0.1 so as to reduce back-scattering of incident light. In this example, the refractive index of the bulk diffuser is 1.520 and the refractive index of the host material is 1.495. The bulk diffuser scatters a light ray 41 incident normal to the lenticular screen in light rays 41' as is shown in trapezoidal structure 11. A light ray 42 incident oblique to the normal at an angle larger than the Brewster angle is reflected and scattered by the bulk diffuser in light rays 42' and 42".

It will be evident that many variations are possible within the framework of the invention.

What is claimed is:

1. A display device comprising:
    a light source,
    a liquid crystal display panel,
    a collimating system for collimating light from the light source on the liquid crystal display panel a predetermined collimating angle, and
    a lenticular screen optically coupled to the liquid crystal display panel at the side of a viewer,
    lenticulars of the lenticular screen being directed in a first direction for enlarging luminance distribution in a second direction,
    characterized in that
    the lenticulars:
        have a trapezoidal shape with two substantially parallel sides and at least one slanted side that forms an apex angle of the trapezoidal shape, and are arranged such that the light from the light source enters via one side of the two parallel sides and exits the other side of the two parallel sides, and
        the apex angle is configured so that light from the light source is reflected from the at least one slanted side to also exit the other side of the two parallel sides, thereby reducing asymmetry of the luminance distribution.

2. A display device as claimed in claim 1, characterized in that the apex angle of the trapezoid is dependent on a desired horizontal spread and a desired viewing angle symmetry in the second direction.

3. A display device as claimed in claim 1, characterized in that the lenticular screen comprises a host material and a bulk diffusing material dispersed in the host material.

4. A display device as claimed in claim 3, characterized in that the bulk diffusing material has a first refractive index which is different from a second refractive index of the host material.

5. A display device as claimed in claim 1, characterized in that the liquid crystal display panels are provided with a front polarizer at the side of the lenticular screen, and the lenticular screen is optically coupled to the front polarizer by means of lamination.

6. A display device as claimed in claim 1, wherein the liquid crystal display panel comprises a plurality of liquid crystal display panel segments configured next to each other in the second direction and having a seam in the first direction.

7. A display device as claimed in claim 6 characterized in that the liquid crystal display panel is provided with a black mask extending across the plurality of liquid crystal display panel segments, the black mask having a periodical structure corresponding to a pitch of a picture element of the liquid crystal display panel.

8. A lenticular screen for use in a display device as claimed in claim 1.

* * * * *